Jan. 29, 1924.
J. F. LOWE
1,481,918
PITMAN OILER
Filed Jan. 10, 1921
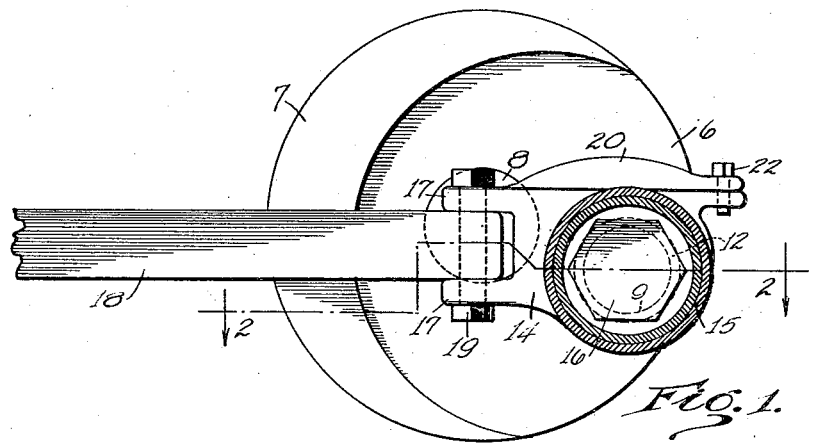
Fig.1.
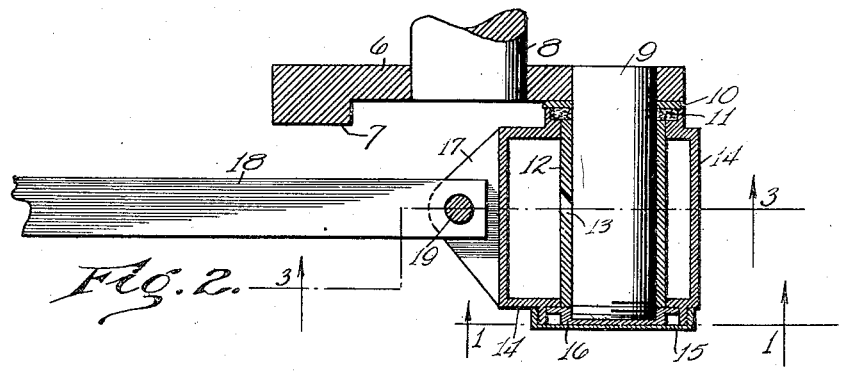
Fig.2.
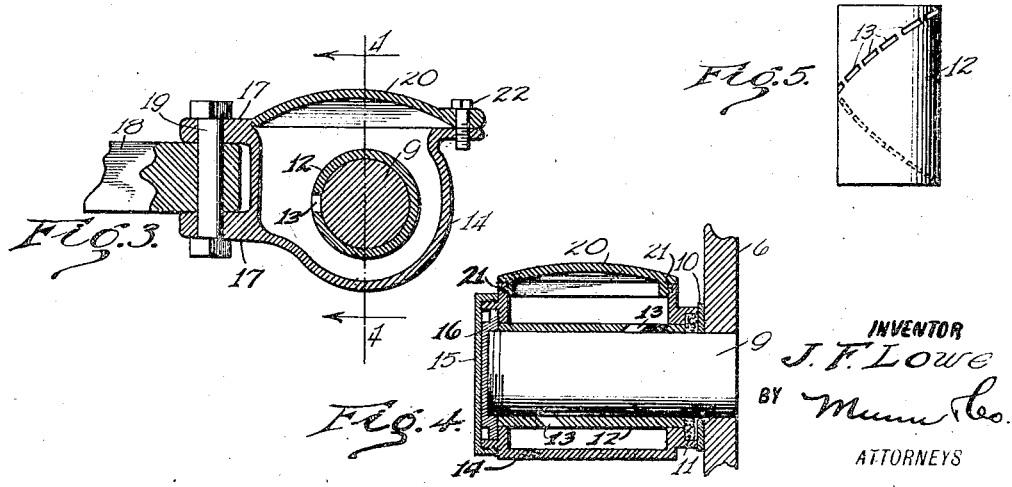
INVENTOR
J. F. LOWE
BY Munn & Co.
ATTORNEYS Patented Jan. 29, 1924.

1,481,918

UNITED STATES PATENT OFFICE.

JAMES F. LOWE, OF MILWAUKEE, WISCONSIN.

PITMAN OILER.

Application filed January 10, 1921. Serial No. 436,238.

*To all whom it may concern:*

Be it known that I, JAMES F. LOWE, a citizen of the United States, and a resident of Milwaukee, in the county of Milwaukee and State of Wisconsin, have invented a new and useful Improvement in Pitman Oilers, of which the following is a full, clear, and exact description.

My invention relates to improvements in lubrication devices, and more particularly in means for lubricating a pitman such as that in use on mowing machines, and it consists in the combinations, constructions, and arrangements herein described and claimed:

Considerable trouble is experienced with a pitman of a mowing machine, in that, especially on a warm day, the bearing is very apt to burn out. This of course necessitates stopping for repairs and occasions considerable loss of time.

An object of my invention is to provide a device by means of which the pitman is throughly lubricated so as to prevent or to eliminate overheating.

A further object of my invention is to provide a lubricator which will contain a considerable quantity of lubricant such as grease or oil, thereby obviating the necessity of frequent filling of the receptacle.

A further object of my invention is to provide a lubricating device having a detachable bearing sleeve, which may be replaced, if desired.

Other objects and advantages will appear in the following specification, and the novel features of the invention will be particularly pointed out in the appended claims.

My invention is illustrated in the accompanying drawings, forming part of this application, in which—

Fig. 1 is a side view of a drive wheel, a portion of the oiler being shown in section, Fig. 2 is a section along the line 2—2 of Fig. 1, Fig. 3 is a section along the line 3—3 of Fig. 2, Fig. 4 is a section along the line 4—4 of Fig. 3, Fig. 5 is a plan view of the bearing sleeve.

In the drawings, 6 indicates a drive wheel or balance wheel having a counterbalancing portion 7. The wheel 6 is mounted on the drive shaft 8 and is provided with a stub-shaft 9 projecting therefrom. Immediately adjacent to the wheel 6 is a steel washer 10 with a felt washer 11 disposed adjacent thereto. Surrounding the stub-shaft 9 is a bearing sleeve 12 which may be made of any suitable material, such as hardened steel or the like. This bearing sleeve is provided with a series of lubricating slots 13 which slant toward the end of the stub shaft 9, as shown in Fig. 2. These slots are preferably arranged in spiral relation as shown in Fig. 5.

Disposed over the bearing sleeve is a casing or housing 14, one end of which is recessed to receive the washer 11. The opposite end is threaded to receive a cap 15. The shaft 9 is also threaded at its end to receive a cap 16 which is provided with a flange arranged to engage a portion of the housing 14 so as to hold the latter in position on the sleeve 12. The housing 14 is provided with a pair of extensions 17 between which the end of the pitman 18 is received. A bolt 19 passes through the extensions 17 and through the pitman to securely fasten the same to the housing 12.

The housing is provided with a cover portion 20, the edges of which are provided with tongues 21 arranged to enter grooves in the upper edge of the housing so as to permit the cover to slide into position where it is firmly secured by means of a retaining member such as the set screw 22.

From the foregoing description of the various parts of the device, the operation thereof may be readily understood. In assembling the device the steel washer 10 and the felt washer 11 are placed in position on the stub-shaft or crank pin 9. The bearing sleeve 12 is slipped over the stub-shaft, the housing is placed in position, the cap 16 is tightened, and the cap 15 is applied. The housing is filled with any suitable lubricant, such as a hard grease or oil, the cover is slid into position and the set screw 22 is screwed down tight.

This provides an oil tight housing for the stub-shaft or crank pin and when the device is in operation, the oil or grease is constantly forced toward the outer end of the stub-shaft, thus thoroughly lubricating the bearing and preventing burning out or overheating of the same.

Since the caps 15 and 16 fit tightly, no oil can escape from this end of the crank pin. The washers prevent escape from the opposite end. The result is that the bearing will operate for a considerable length of time without the necessity of renewing the lubricant or of any danger of overheating. In case it is desirable to replace the bearing sleeve, it may be readily done in a few minutes time.

I claim:

The combination with a crank pin, an operating sleeve mounted for rotation on said crank pin, said operating sleeve having a plurality of openings therethrough, and an oil-tight casing arranged to contain a lubricant mounted concentric with said sleeve and arranged to leave a space between said casing and said sleeve on all sides thereof, that space adjacent the inner side of the sleeve being larger than the remaining space, whereby the lubricant in said casing may accumulate in large quantities in said enlarged space.

JAMES F. LOWE.